United States Patent [19]
Bazant et al.

[11] 3,834,740
[45] Sept. 10, 1974

[54] CONNECTING PIECE FOR PRESSURE VESSEL COVER OF NUCLEAR REACTORS

[75] Inventors: Erich Bazant; Horst Cerjak; Manfred Scholz, all of Erlangen, Germany

[73] Assignee: Siemens Aktiengesellschaft, Berlin & Munchen, Germany

[22] Filed: Nov. 20, 1970

[21] Appl. No.: 91,302

[30] Foreign Application Priority Data
Nov. 22, 1969 Germany............................ 1958670

[52] U.S. Cl.................... 285/55, 285/286, 285/422, 285/189
[51] Int. Cl.............................................. F16l 9/14
[58] Field of Search ............. 285/55, 286, 184, 422; 220/63 R

[56] References Cited
UNITED STATES PATENTS
2,136,474  11/1938  Stroty .............................. 285/55 X
2,216,033  9/1940  Hopkins............................ 285/55 X
3,317,222  5/1967  Moretzo........................... 285/286 X
3,349,951  10/1967  Peterson ........................... 220/63 R FOREIGN PATENTS OR APPLICATIONS
706,342  3/1954  Great Britain...................... 285/422

*Primary Examiner*—Dave W. Arola
*Attorney, Agent, or Firm*—Herbert L. Lerner

[57] ABSTRACT

A connecting piece extends into a port formed in a nuclear reactor pressure vessel cover having a plated layer on the inner surface thereof. The compound piece is made up of a compound tube provided with an austenitic steel inner liner tube at least in the vicinity of the port, the connecting tube extending within the port substantially to the inner surface of the pressure vessel cover and being secured to the plated layer by welding.

2 Claims, 4 Drawing Figures

PATENTED SEP 10 1974 3,834,740

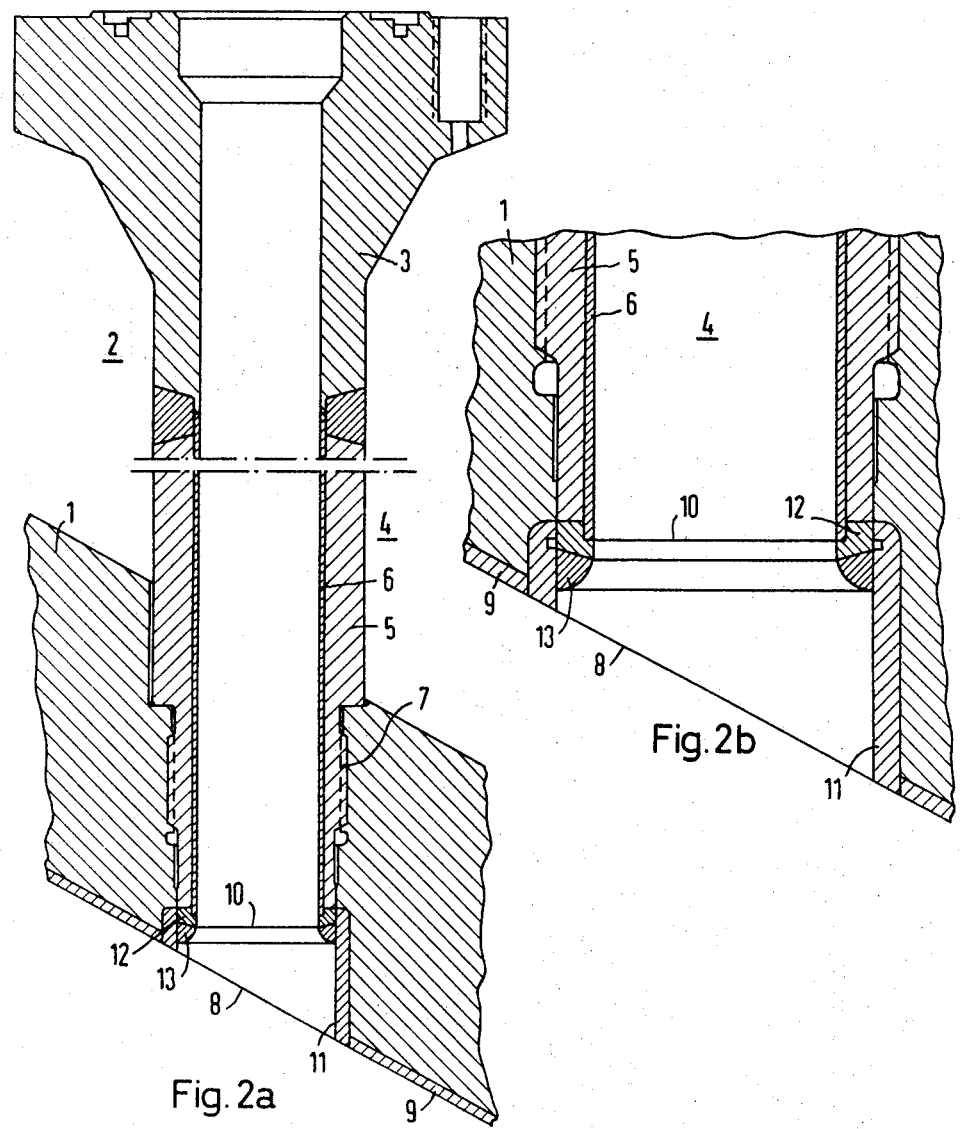

CONNECTING PIECE FOR PRESSURE VESSEL COVER OF NUCLEAR REACTORS

Our invention relates to connecting piece for pressure vessel covers of nuclear reactors.

The very highest requirements as to imperviousness and durability or resistance to all occurring loads and stresses are imposed on the junctions or connections of connecting pieces or access tubes for fuel elements and control rod drive mechanisms and the like in the pressure vessel cover of atomic reactors.

According to practices heretofore employed, the connecting pieces, which are formed for example of a corrosion resistant Ni-Cr-Fe alloy such as inconel or the like, are threadedly secured in a port formed in the cover, but only at the upper part of the cover. The connecting pieces in this known method are connected in the port to the inside or underside of the cover or up to the plated layer located at the inside or underside of the cover by means of a liner tube which, after the connecting piece has been threadedly secured or shrink-fitted into the port is rolled into the connecting piece and into the port formed in the cover. This liner tube is then welded at the lower end thereof to the plated layer on the inner or underside of the cover. The production of this type of junction of connecting pieces and cover is beset by considerable difficulties in manufacturing technology because the tube liner can only be inserted after the connecting piece has been installed in the port formed in the pressure vessel cover. Moreover, the tight installation of the lining tube against the cover surface defining the port causes great difficulty due to the fact that the materials of which the lining tube and the cover are formed are different and have different thermal coefficients of expansion. Similar difficulties arise due to the tight engagement of the lower end of the tube liner with the inner plated layer of the cover which are also formed of different materials. Furthermore, in this heretofore known method, the connecting piece must be subjected to after-treatment or subsequent machining, and also, for the most part, the entire cover with the installed connecting piece must be tempered or reannealed.

It is accordingly an object of our invention to provide connecting piece for pressure vessel covers of nuclear reactors which afford a trouble-free connection or junction thereof with the covers.

It is a further object of our invention to provide such connecting pieces which are in finally machined form before they are installed in the respective ports of a cover, and are always easily exchangeable.

With the foregoing and other objects in view, we provide in a nuclear reactor, pressure vessel cover having a plated layer on the inner surface thereof and formed with at least one port, a connecting piece extending into the port and comprising a compound tube formed with an austenitic steel inner liner tube at least in the vicinity of the port, the compound tube extending within the port substantially to the inner surface of the pressure vessel cover and being secured to the plated layer by welding.

Further in accordance with the invention, we provide two possible constructions for connecting the liner tube to the inner plated layer of the cover. Thus, in accordance with the invention, we provide the compound tube with a lower edge shaped so as to terminate in substantially flush alignment with the spherically arched inner surface of the cover, and further provide a weld material deposit covering a region of the plated layer of the cover adjacent the port and extending beyond the edge of the port beneath the lower edge of the compound tube, the lower edge of the compound tube being secured by welding to the weld material deposit.

The other possible construction according to the invention includes a ring-shaped plated layer received in the port of the cover and the compound tube has a flat lower end surface extending in a plane perpendicular to the axis of the tube, and is provided with an end layer of austenitic steel, the end layer of austenitic steel being secured by welding to the ring-shaped plated layer.

In accordance with a further feature of the invention, the layer of austenitic steel located at the lower end of the compound tube is formed of the same material as that of the inner lining tube. It is thereby possible to complete machining of the connecting piece before it is inserted into the port formed in the pressure vessel cover. The welding of the connecting pieces into the port presents no difficulty because the lining tube and the layer of austenitic steel at the end of the compound tube, on the one hand, as well as the plate layer of the cover, on the other hand, consists of the same material. This calls for the same thermal coefficient of expansion because, on the other hand, the cover and the connecting pieces proper are made of the same ferritic material.

Other features which are considered as characteristic for the invention are set forth in the appended claims.

Although the invention is illustrated and described herein as embodied in connecting piece for pressure vessel covers on nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 2a is a cross-sectional view of a much enlarged fragment of FIG. 1, showing a control rod connecting piece secured in a port formed in the reactor vessel cover;

FIG. 2b is an enlarged cross-sectional view of the lower part of FIG. 2; and

Figure 1:
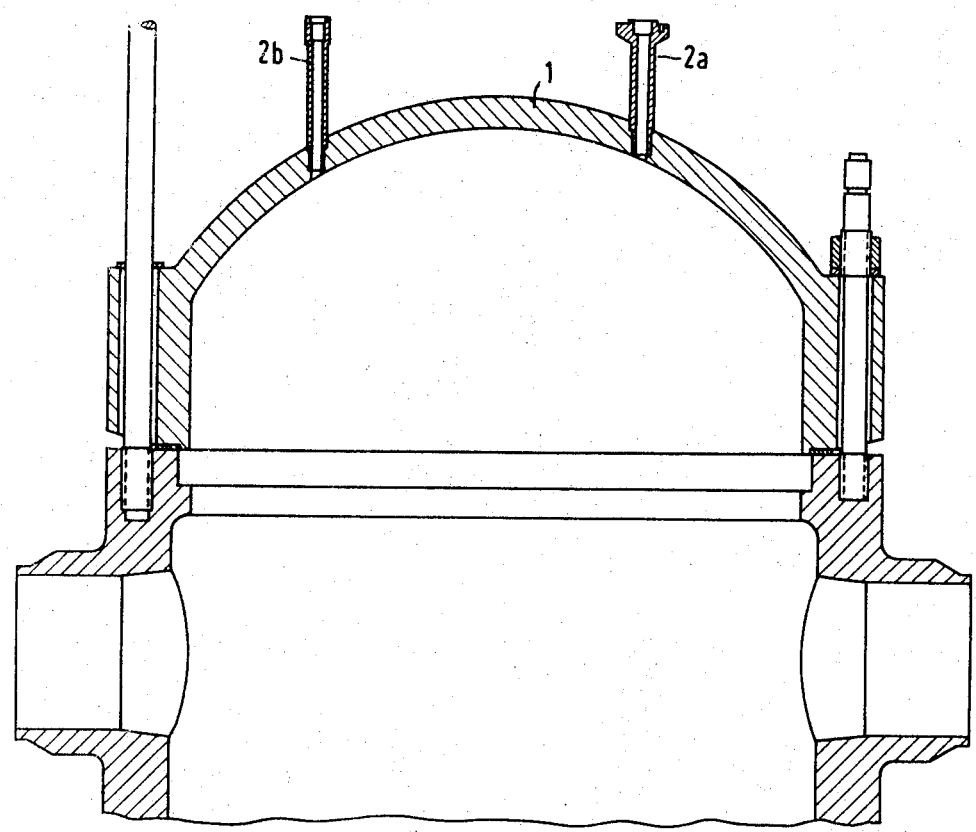
FIG. 1 is a cross-sectional view of the upper end of a nuclear reactor pressure vessel showing the cover secured thereto.

Referring now to the drawings and first particularly of FIG. 1, there is shown a cover 1 of a reactor pressure vessel, the cover being spherically arched and being provided with a plurality of vertically extending control rod connecting pieces 2a and core instrumentation connecting pieces 2b disposed parallel to one another. Nonillustrated drive mechanisms are fastened to the upper end of the connecting pieces 2a, 2b.

In FIG. 2a, there is shown the construction and disposition of a connecting piece in a reactor pressure vessel cover 1. The connecting piece 2 is formed of a flange-like upper portion 3 consisting of one uniform material. A so-called compound tube 4 is welded to the upper portion 3 so as to form a downward extension therefrom, the compound tube 4 being made of ferritic outer tube 5, and an austenitic steel lining tube 6 having an inner plated layer. The compound tube 4 is screwed into a thread formed in the upper part of the corresponding port provided in the cover 1. The compound tube 4 extends beyond the thread 7 and terminates substantially at the inner edge 8 of the port formed in the vessel cover 1, the inner surface of the cover 1 being provided with a plated layer 9. The compound tube 4 proper has a horizontal terminal edge which extends in a plane perpendicular to the axis of the connecting piece 2.

The manner in which the connecting piece 2 is welded to the cover 1 is shown in an enlarged view in FIG. 2b. The compound tube 4 proper is terminated at the lower edge 10 thereof with an austenitic steel clip-like annular layer 12 which is firmly connected both to the outer tube 5 as well as to the austenitic liner tube 6. The remaining surface of the port formed in the cover 1 from the lower end 10 of the compound tube 4 down to the cover plated layer 9 is provided with a plated layer 11 of austenitic steel, so that by a tight weld 13 a firm bonding of the compound tube 4 and the cover 1 as well as of the clip-like annular layer 12 and the lining layer 11 of the port formed in the cover is possible. In the event an exchange of the connecting piece is necessary, one need only open the tight weld 13 to permit the release of the connecting piece.

In contrast to the constructions known heretofore, corresponding to which the connecting pieces are threadedly secured only at the upper portion of the cover and wherein an inner plate layer common to both the connecting piece and the port formed in the cover is subsequently applied, a practice which is accompanied by considerable difficulties in manufacture and selection of materials, the connecting pieces according to the invention in the instant application are fully manufactured and machined before installation into the port formed in the cover. Due to mutually corresponding materials, trouble-free weldability is provided for the same thermal coefficient of expansion of the compound tubes and vessel material. The selection of the bonding or welding material can be made in accordance with the requirements of the construction and design because the characteristics or properties of the bonding or welding material are very similar to those of the material of the pressure vessel. The plate layer of the compound tube 4 of the invention is as corrosion-resistant as the plated layer 9 of the pressure vessel cover 1. Since the connecting pieces known heretofore were formed of austenitic steel or inconel, considerable problems were produced when welding the same into the ferritic base portion of the reactor vessel cover 1.

Figure 3:
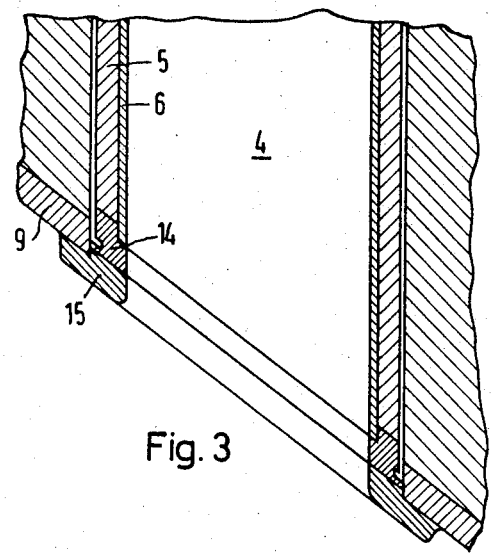
FIG. 3 is a sectional view similar to that of FIG. 2b, showing another embodiment of a connecting piece secured to the cover in accordance with the invention.

A further embodiment of the invention is shown in FIG. 3 wherein the compound tube 4 formed of an outer ferritic tube 5 and inner plated lining tube 6 extend down to the inner edge of the surface of the cover 1 which defines the respective port that is formed therein and terminates therewith as shown, because of the spherical arched shape thereof, i.e., the lower edge of the compound tube 4 is formed so as to correspond to the arch of the cover at the location of the port. The compound tube 4 is then welded through an austenitic clip-like annular layer 14, provided at the end thereof, and a deposit of weld material 15 which covers an area of the cover plated layer 9 adjacent the port and extends into the port below the underside of the compound tube 4 to the plated layer 9.

By means of the aforedescribed and illustrated compound tubes and the manner of installation thereof in the cover of a pressure reactor vessel, a simplified manufacture and machining thereof is possible before the installation of the connecting pieces. Moreover, thermal stresses can be largely avoided because of the fact that the compound tubes and the vessel are formed of material having the same thermal coefficient of expansion.

We claim:

1. In a nuclear reactor pressure vessel cover having a plated layer on the inner surface thereof and formed therein with at least one port, a connecting piece extending into the port and comprising a compound tube formed with an austenitic steel inner liner tube at least in the vicinity of said port, said compound tube extending within said port substantially to the inner surface of the pressure vessel cover, and being secured to said plated layer by welding, said pressure vessel cover having a spherically arched inner surface, said compound tube having a lower edge shaped so as to terminate in substantially flush alignment with the spherically arched inner surface of the cover, and including a weld material deposit covering a region of the plated layer of the cover adjacent said port and extending beyond the edge of said port beneath said lower edge of said compound tube, said lower edge of said compound tube being secured by welding to said weld material deposit.

2. In a nuclear reactor pressure vessel cover having a plated layer on the inner surface thereof and formed therein with at least one port, a connecting piece extending into the port and comprising a compound tube formed with an austenitic steel inner liner tube at least in the vicinity of said port, said compound tube extending within said port substantially to the inner surface of the pressure vessel cover, and being secured to said plated layer by welding and further comprising a ring-shaped plated layer received in said port at the periphery thereof adjacent the inner surface of the pressure vessel cover; said compound tube having a flat lower end surface extending in a plane perpendicular to the axis of said compound tube and formed with an end layer of austenitic steel secured to said inner liner tube, said austenitic steel end layer being, in turn, secured by welding to said ring-shaped plated layer.

* * * * *

UNITED STATES PATENT AND TRADEMARK OFFICE
Certificate

Patent No. 3,834,740                 Patented September 10, 1974

Erich Bazant, Horst Cerjak and Manfred Scholz

Application having been made by Erich Bazant, Horst Cerjak and Manfred Scholz, the inventors named in the patent above identified, and Siemens Aktiengesellschaft, Berlin and Munchen, Germany, a corporation of Germany, the assignee, for the issuance of a certificate under the provisions of Title 35, Section 256, of the United States Code, adding the name of Ottokar Frodl as a joint inventor, and a showing and proof of facts satisfying the requirements of the said section having been submitted, it is this 10th day of January 1978, certified that the name of the said Ottokar Frodl is hereby added to the said patent as a joint inventor with the said Erich Bazant, Horst Cerjak and Manfred Scholz.

FRED W. SHERLING,
*Associate Solicitor.*